United States Patent
Sirajuddin

(10) Patent No.: US 10,445,112 B2
(45) Date of Patent: Oct. 15, 2019

(54) INLINE DISPATCHING FUNCTION INTERFACE (IDFI), AND ASSOCIATED SYSTEM AND/OR METHOD

(71) Applicant: Software AG, Darmstadt (DE)

(72) Inventor: Nasiruddin Sirajuddin, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 93 days.

(21) Appl. No.: 15/417,737

(22) Filed: Jan. 27, 2017

(65) Prior Publication Data

US 2018/0217851 A1      Aug. 2, 2018

(51) Int. Cl.
    *G06F 9/445*      (2018.01)
(52) U.S. Cl.
    CPC .................. *G06F 9/44521* (2013.01)
(58) Field of Classification Search
    CPC ........ G06F 9/44541; G06F 9/52; G06F 9/542; G06F 9/541; G06F 9/44521; G06F 9/45529
    See application file for complete search history.

(56) References Cited

U.S. PATENT DOCUMENTS

| | | | | |
|---|---|---|---|---|
| 5,410,698 A * | 4/1995 | Danneels | ............ | G06F 9/44521 348/E5.002 |
| 6,154,878 A * | 11/2000 | Saboff | ............ | G06F 8/656 717/173 |
| 6,219,830 B1 * | 4/2001 | Eidt | ............ | G06F 9/44521 710/68 |
| 6,499,137 B1 * | 12/2002 | Hunt | ............ | G06F 9/44521 717/164 |
| 2002/0198963 A1 * | 12/2002 | Wu | ............ | G06F 17/30899 709/219 |
| 2004/0226031 A1 * | 11/2004 | Zimmerman | ....... | G06F 9/44521 719/331 |
| 2005/0223018 A1 * | 10/2005 | Forin | ............ | G06F 9/4411 |
| 2007/0067573 A1 * | 3/2007 | Bruening | ............ | G06F 9/3851 711/125 |

(Continued)

OTHER PUBLICATIONS

Aixxe, "Loading, unloading & reloading shared libraries", Sep. 2016, pp. 1-6.*

(Continued)

*Primary Examiner* — Thuy Dao
*Assistant Examiner* — Phuong Ngoc Hoang
(74) *Attorney, Agent, or Firm* — Nixon & Vanderhye P.C.

(57) ABSTRACT

Certain example embodiments relate to an inline dispatching function interface (IDFI) statically linked to an application and dynamically linkable to at least one library. The IDFI is transparent to the application. Processing resources maintain a process space and execute the application in connection with it. The at least one library is usable by, but external to, the application. The IDFI is configured to at least: automatically reload the at least one library into the process space during runtime in response to a detected trigger event, without interrupting processing of the application, and while also automatically synchronizing processing threads relevant to execution of the at least one library; receive, from the application and through header file directives added to the application during compilation of the application, a call for a function of the at least one library; and responsive to reception of the call, execute the call to the function.

25 Claims, 9 Drawing Sheets

(56) References Cited

U.S. PATENT DOCUMENTS

2012/0174124 A1* 7/2012 Ward .................. G06F 8/71
719/331

OTHER PUBLICATIONS

Wikipedia—Library (Computing), retrieved Jan. 27, 2017, 1 page. https://en.wikipedia.org/wiki/Library_(computing).
Wikipedia—Application Software, retrieved Jan. 27, 2017, 1 page. https://en.wikipedia.org/wiki/Application_software.
Wikipedia—Include Directive, retrieved Jan. 27, 2017, 1 page. https://en.wikipedia.org/wiki/Include_directive.
Wikipedia—DLL Hell, retrieved Jan. 27, 2017, 1 page. https://en.wikipedia.org/wiki/DLL_Hell.
Wikipedia—Inline Function, retrieved Jan. 27, 2017, 1 page. https://en.wikipedia.org/wiki/Inline_function.
Wikipedia—Callback (Computer Programming), retrieved Jan. 27, 2017, 1 page. https://en.wikipedia.org/wiki/Callback_(computer_programming).
Libuv API documentation, retrieved Jan. 27, 2017, 1 page. http://docs.libuv.org/en/v1.x/

* cited by examiner

```
#ifndef OBJECT_H_INCLUDED
#define OBJECT_H_INCLUDED
#include "error.h"
typedef struct object_s object_t, *object_h;

error_t create(object_t **o);
error_t set(object_t *o, const char *p);
error_t get(object_t *o, const char **p);
error_t release();

#include "object_idfi.h"
#endif /* OBJECT_H_INCLUDED */

<<object_idfi.h expanded below>>
define OBJECT_IDFI_H_INCLUDED include "idfi_macros.h"

undef IDFI_PRODUCT_NAME
#undef IDFI_LIBRARY_NAME
#undef IDFI_MODULE
undef IDFI_LIBRARY_VERSION define IDFI_PRODUCT_NAME       "PRODUCT"
define IDFI_LIBRARY_NAME       DEFINE_IDFI_LIB(object)
#define IDFI_MODULE             "object"
define IDFI_LIBRARY_VERSION    0x0001 static unsigned int object_lib_version;

CPP(extern "C" {)
/*
 * For each exported function of the library IDFI_LIBRARY_NAME
 * provides one IDFI_ARG_EXPANDER below,
 * specifying the function name and the function signature.
 */
#undef IDFI_ACTUAL_ARG_EXPANDER
#define IDFI_ACTUAL_ARG_EXPANDER\
```

Fig. 3A

```
    IDFI_ARG_EXPANDER(error_t,create,(object_t **o),(o))\
    IDFI_ARG_EXPANDER(error_t,set,(object_t *o, const char *p),(p))\
    IDFI_ARG_EXPANDER(error_t, get,(object_t *o, const char **p),(p))\
    IDFI_ARG_EXPANDER(error_t,release,(object_t *o),(o))
static const char *object_function_namess[] = {
#define IDFI_ARG_EXPANDER(ret_type, function, signature, arg)
#function,
    IDFI_ACTUAL_ARG_EXPANDER
undef IDFI_ARG_EXPANDER
};

typedef struct object_functions_s {
#define IDFI_ARG_EXPANDER(ret_type, function, signature, arg) ret_type
    (*function##_fn) signature;
IDFI_ACTUAL_ARG_EXPANDER
undef IDFI_ARG_EXPANDER
}object_functions_t;
static object_functions_t *object_functions;

#define object_function_size
    (sizeof(object_function_namess)/sizeof(object_function_namess[0]))

#define IDFI_ARG_EXPANDER(ret_type, function, signature, arg) \
IDFI_STUB_CREATOR(&object_lib_version, IDFI_PRODUCT_NAME,\
    IDFI_LIBRARY_NAME, IDFI_LIBRARY_VERSION, IDFI_MODULE, \
    ret_type, function, signature, arg, \
    object_function_namess, &object_functions, \
    object_function_size)
    IDFI_ACTUAL_ARG_EXPANDER
undef IDFI_ARG_EXPANDER undef IDFI_ARG_EXPANDER
CPP(})
#endif /* OBJECT_IDFI_H_INCLUDED */
#endif /* #if  !defined(NO_IDFI) && !defined(NO_OBJECT_IDFI)*/
```

Fig. 3B

```
/* Library */
file_logger.c
#include "ma/logger/ma_file_logger.h"

#include <stdio.h>
include <stdlib.h> ma_error_t ma_file_logger_create( const char *log_base_dir , const char
*log_file_name  , const char *log_file_ext  ) {
    if(log_file_name) {
        printf("I'm version 3\n");
        return MA_OK ;
    }
    return MA_ERROR_INVALIDARG;
} ma_error_t ma_file_logger_release() {
    return MA_OK;
}

<file_logger.h>
ma_error_t ma_file_logger_create(const char *log_base_dir , const char
*log_file_name  , const char *log_file_ext );
ma_error_t ma_file_logger_release();
#include "ma/dispatcher/ma_file_logger_dispatcher.h"

<file_logger_dispatcher.h>
#include "ma/dispatcher/ma_dispatcher_macros.h"
#undef MA_DISPATCHER_PRODUCT_NAME
#undef MA_DISPATCHER_LIBRARY_NAME
#undef MA_DISPATCHER_MODULE
undef MA_DISPATCHER_LIBRARY_VERSION define MA_DISPATCHER_PRODUCT_NAME      "PRODUCT"
define MA_DISPATCHER_LIBRARY_NAME      ma_logger
#define MA_DISPATCHER_MODULE            "ma_logger"
#define MA_DISPATCHER_LIBRARY_VERSION   0x100
static unsigned int ma_file_logger_lib_version;

undef MA_DISPATCHER_ACTUAL_ARG_EXPANDER define MA_DISPATCHER_ACTUAL_ARG_EXPANDER\

MA_DISPATCHER_ARG_EXPANDER (ma_error_t, \
                            ma_file_logger_create, \
                            (const char *log_base_dir, \
                             const char *log_file_name, \
                             const char *log_file_ext), \
                            (log_base_dir, \
                             log_file_name, \
                             log_file_ext) \
                            )\
MA_DISPATCHER_ARG_EXPANDER (ma_error_t, \
                            ma_file_logger_release, \
                            (), \
                            ()\
                            )
```

Fig. 5A

```
static const char *ma_file_logger_function_names[] = { define MA_DISPATCHER_ARG_EXPANDER(ret_type, function, signature, arg)
function,

MA_DISPATCHER_ACTUAL_ARG_EXPANDER undef MA_DISPATCHER_ARG_EXPANDER

};

typedef struct ma_file_logger_functions_s { define MA_DISPATCHER_ARG_EXPANDER(ret_type, function, signature, arg) ret_type
(*function##_fn) signature;

MA_DISPATCHER_ACTUAL_ARG_EXPANDER undef MA_DISPATCHER_ARG_EXPANDER

}ma_file_logger_functions_t;

static ma_file_logger_functions_t *ma_file_logger_functions;
#define ma_file_logger_functions_size
(sizeof(ma_file_logger_function_names)/sizeof(ma_file_logger_function_names[0]))
#define MA_DISPATCHER_ARG_EXPANDER(ret_type, function, signature, arg) \

MA_DISTPATCHER_ARG_STUB_CREATOR (&ma_file_logger_lib_version,
                                MA_DISPATCHER_PRODUCT_NAME,
                                MA_DISPATCHER_LIBRARY_NAME,
                                MA_DISPATCHER_LIBRARY_VERSION,
                                MA_DISPATCHER_MODULE,
                                ret_type,
                                function,
                                signature,
                                arg,
                                ma_file_logger_function_names,
                                &ma_file_logger_functions,
                                ma_file_logger_functions_size)
MA_DISPATCHER_ACTUAL_ARG_EXPANDER undef MA_DISPATCHER_ARG_EXPANDER
undef MA_DISPATCHER_ARG_EXPANDER

<dispatcher.h>
typedef struct ma_dispatcher_callbacks_s ma_dispatcher_callbacks_t;
typedef struct ma_dispatcher_s ma_dispatcher_t, *ma_dispatcher_h;
struct ma_dispatcher_callbacks_s {
                    void (*on_update)(ma_dispatcher_t *dispatcher,
                                      char *delta_libs,
                                      int *delay);
};

ma_error_t ma_dispatcher_initialize(const char *default_rsdk_path,
ma_dispatcher_t **dispatcher_handle);
ma_error_t ma_dispatcher_register_callbacks(
                ma_dispatcher_t *dispatcher,
                ma_dispatcher_callbacks_t *callbacks);
```

Fig. 5B

```
ma_error_t ma_dispatcher_deinitialize(ma_dispatcher_t *dispatcher_handle);

<application>
#include "ma/ma_dispatcher.h"
#include "ma/logger/ma_file_logger.h"
#include "ma/ma_common.h"

include <stdio.h> int main(int argc, char *argv[]) { ma_error_t err = MA_OK;
    ma_dispatcher_t *dispatcher = NULL;

if(argc != 3) {
        printf( "usage: %s app", argv[0] );
        return 0;
    }
    if(MA_OK == (err = ma_dispatcher_initialize(argv[1], &dispatcher))) {
        while(1) {
            ma_file_logger_create("1", "1", "1");
        }
          (void)ma_dispatcher_deinitialize(dispatcher);
    } return 1;
}
```

Fig. 5C

INLINE DISPATCHING FUNCTION INTERFACE (IDFI), AND ASSOCIATED SYSTEM AND/OR METHOD

TECHNICAL FIELD

Certain example embodiments described herein relate to techniques for improving computer systems that leverage external libraries with functions and/or other symbols. More particularly, certain example embodiments described herein relate to an Inline Dispatching Function Interface (IDFI) that is statically linked to by a calling application and that dynamic links to an external library, thereby enabling the calling application to make external library calls as if the calling application and the external library were statically linked while also in some cases enabling the external library to be modified without requiring an application restart, etc. Associated systems, methods, and computer readable storage media also are contemplated herein.

BACKGROUND AND SUMMARY

Most commercial and enterprise application software uses external libraries to perform different computer-related functionality, and the usage of external, shared libraries is a widely accepted paradigm for most programming languages and many computer operating systems. Shared libraries typically represent implementations of standard functions that are used by multiple applications and implemented in a specific programming language (for example, in C, C+, or Java). Shared libraries usually represent a collection on functions around a certain topic and therefore may provide, for example, a graphics library (e.g., with graphics rendering functionality), help and logging functions, database routines, network-based communication, interfaces with internal or external computer-based resources, etc.

External, shared libraries are referred to by a variety of names. For instance, Windows-based operating systems use the term "DLL" (Dynamic Load Library), Unix-based operating systems oftentimes refer to "Shared Libraries" or "Shared Objects", etc. Some computer systems have embedded external shared library technology via the use of, for example, the Executable and Linkable Format (ELF) on Unix-based systems, which enables (among other techniques) the notion of a shared library concept.

Several common programming techniques are implemented to allow functions defined in external libraries to be used in these and other contexts. These techniques include, among other things, static binding, dynamic linking, and deferred loading approaches.

In general, applications using external libraries expect dependencies to be resolved during linking time, and the language statements are to be translated (oftentimes individually) into sequences of instructions that a machine can understand. These instructions can be packaged in or accessed by an executable binary. This process can be time consuming, however, as it may be necessary to package entire libraries at a time, repackage an entire library when only one function or other symbol therein changes, etc.

Furthermore, during execution of a binary, and depending on the implementation approach selected, references to external libraries in the code can be resolved by the processor, which may trigger loading of the entire library into the process space to execute the function calls. In at least some of such cases, the referenced libraries during execution may exist in the process space, irrespective of whether the application is invoking or referring to anything in those libraries, thereby potentially requiring a significant amount of overhead (e.g., memory space). Oftentimes, no decision will be made as to when or how to unload libraries that are unused and/or not referenced by the application binary, thereby requiring a large and potentially increasing amount of overhead.

These and/or other problems may exist with the various programming paradigms used in connection with external shared libraries. Using a static binding approach, for example, external function definitions typically are identified in and made available via a header file or the like, and bundled together during compilation of the main (typically calling) application. The linker used at compile time of the main application resolves the addresses or locations of the external library functions. Unfortunately, however, the static binding approach can increase the size of the application, e.g., because of the bundling together of the required external libraries.

It will be appreciated that one standard way of using shared libraries typically includes loading all dependent libraries at once into the process space of the executing (e.g., main) application, resolving all references from the main application into functions of the shared libraries (as well as the function calls from just-loaded shared libraries into yet again different shared libraries, etc.) until all open references are resolved. Unloading typically only happens at program termination. Dependencies between different shared libraries increases the difficulty that arises related to different versions of these libraries and their compatibility, and this has even been termed "DLL Hell" by some.

When dynamic linking is implemented, external function names are checked at compile time of the main application, but the shared libraries are not statically linked to and part of the final resulting application. Instead, the shared libraries are loaded at runtime, e.g., during the initialization phase of the main application in a more "on-demand" manner. Unfortunately, however, the associated code maintenance and linking management sometimes provides an opportunity for the introduction of errors of different magnitudes. In this regard, unwanted changes in the function code could cause errors, or the initialization (the linker phase at initialization time) could terminate abnormally with an error, causing the application to be unable to start again.

Deferred loading typically is seen to involve the most flexible approach for loading external shared libraries and their functions, e.g., by leveraging explicit runtime calls. In this approach, the libraries are only loaded at specific times within the running application. Any errors that occur during initialization can explicitly be handled by the application, thus making the code more robust. Unfortunately, however, these advantages come at the cost of more coding effort in the main application, as it typically is not possible to merely reference the function name within the calling program and, instead, various system function calls generally are required to load and resolve the external functions. Moreover, processing overhead can increase because at least two call switches typically will be implemented, i.e., in calling and closing each function, thereby using CPU cycles. Furthermore, the required system function calls generally are platform and/or operating system specific, thereby limiting code reuse.

Thus, it will be appreciated that one step towards a more efficient way to calling functions is the notion of an inline function to be handled by the pre-processor of the compile step. This may create (depending on the complexity of the function) at each reference of the function the complete function itself. On one hand, this can lead to much better performance at runtime. But on the other hand, it typically requires more code and increases the (object) size of the program.

Regardless of the implementation selected, an application that has a dependency to an external library may require manual processes associated with understanding the different sets of foreign library versions. This too can be time-consuming and sometimes can lead to serious application downtime, e.g., to facilitate updates for the latest external library patches. Problems thus can arise in the context of mission critical and/or other software business systems.

Similarly, regardless of the implementation selected, when a change is made to an external library, it oftentimes is necessary to recompile, restart, and/or reconfigure the program using that library. For example, applications using static bindings generally will need to be recompiled and restarted. Applications using dynamic links or implementing deferred bindings may need to be restarted and/or reprogrammed, e.g., to take advantage of changes to the library, account for deprecated functionality, etc.

Consider, for example, long-running applications (e.g., a database or other central/core application of an enterprise) that cannot easily be halted or stopped for administrative purposes in order to reload or refresh a specific shared library. Refreshing of shared libraries nonetheless is still a very common task, because shared libraries are typically developed (and/or distributed) by different departments of, or compared to, an in-house information technology (IT) department of a company, come from different vendors, etc. Fixing a bug (e.g., a computer software or other error) usually would replace the existing version of a program (e.g., a shared library) with a new, corrected version. In order to activate such a new version, any occurrence of the old version usually must be unloaded from any executing application, and the new version usually must be reloaded into the address space (e.g., the runtime execution environment) of an application. This typically requires "shutting down" or terminating the original running main application, which may not always be possible or practical.

Thus, it will be appreciated that it would be desirable to improve binding techniques associated with applications using external libraries. For instance, it will be appreciated that it would be desirable to cut down on the downtime associated with application restarts and/or library reloads needed when changes are made to an external library that it uses (e.g., when a graphics library is updated and the application using that library might need to be recompiled). It also would be desirable to provide easier (e.g., less custom) coding, allow for better code reuse, realize less overhead, and/or the like.

As will be appreciated from the detailed description below, certain example embodiments allow the main application to continue to run (e.g., execute), even as shared libraries in whole or in part are modified. In this regard, in certain example embodiments, a reloading process for the libraries can be triggered automatically or under the control of the main application (e.g., dynamic reload can be performed in an automatic fashion, but control can also be provided by the main application). The involved libraries can be marked individually for replacement (e.g., including reloading), or a whole group of libraries can be assigned for a reload event. And as will be apparent from the example implementation provided below, switching from a standard shared library implementation to the approach described herein advantageously does not require source code changes in the main application code or in the code of the shared library. Instead, a library layer and adaptions within header files may be used to enable these changes.

One aspect of certain example embodiments relates to an Inline Dispatching Function Interface (IDFI) that makes use of the inline concept to improve performance and includes a small layer positioned between the calling (e.g., main) application and the called (e.g., shared) library.

Another aspect of certain example embodiments relates to an IDFI, which enables external library functions to be included declaratively as part of an imported header file associated with a program. Certain example embodiments combine the compilation operations of static linking with deferred loading, thus potentially eliminating the need for recompilations and therefore restarts.

Another aspect of certain example embodiments relates to allowing programmers to use an interface as a transitional middle layer containing a repository of external libraries that can be used by the application that is being programmed. Function definitions contained in the external libraries (e.g., foreign function definitions) may be stored in or accessible to the interface and imported during compilation time. Advantageously, this may minimize or at least reduce the application's maintenance cost by helping to avoid the need for recompilation whenever a foreign function in an external library is modified. This also can help avoid issues with possible mistyping and errors at runtime.

Based on the description below, it will be appreciated that certain example embodiments make external library function definitions available in header files or the like. This advantageously helps to ensure that that the external library functions are available to the application program during compile time, thus reducing the overhead related to linking and loading. It also will be appreciated that certain example embodiments involve deferred loading of the library functions into the process space of the application, which advantageously provides external library functions on-demand when a function is referenced in the application program. The specification of functions and/or other symbols at compile time via entries in a header file or the like also is advantageous because it reduces the likelihood of mistyping and errors at runtime. Certain example embodiments maintain a reference to all external library functions in branch tables (each of which is a table or other structure including a symbol, address, and reference count) and unloads the function from the CPU process space after all reference handles have been released by the application. For instance, in certain example embodiments, a memory allocation helper routine enables a piece of memory to be inherited between the different versions of one shared library. The IDFI of certain example embodiments supports dynamic as well as manual reloading of shared libraries.

The pre-processing approach usable with certain example embodiments helps address issues associated with using a separate pre-processing step by giving the compiler control of pre-processing. This helps with the issue of accessing private class members in an external library. Certain example embodiments implement the inline function interfaces as a substitute to the original external library function, ensuring that the behavior of the function remains the same. The substituted inline function in certain example embodiments is internally provided using a hook to find the exact function or other symbol of the external library function that is expanded during runtime, thereby reducing the overhead related to multiple function calls.

Certain example embodiments create the exact external library function with the substituted body and with the same signature and return type, thus optimizing or at least improving the linking time efficiency because the external library function and/or other symbols are now available during compilation time. The compiler checks for the correct use of the external library function's argument list and returns an error, as appropriate. In other words, with the help of the header file definitions, the IDFI of certain example embodiments can create an exact copy of the external library function as an inline call, which can provide safe type-checking and type-casting at compilation time, and provide good performance during execution at runtime.

It will be appreciated that there are advantages of having inline definitions as compared to external function calls. For example, modern compilers oftentimes recommend the use of inline definitions in a header file. When the compiler sees such a definition, it places the function type (the signature combined with the return value) and the function body in its symbol table. Furthermore, when a function is invoked, the compiler usually checks to ensure that the call is correct and the return value is being used correctly. The compiler then substitutes the function body with the complete function call, thus eliminating or at least reducing the overhead. The inline code occupies space, but if the function is small, this can actually take less space than the code generated to perform an ordinary function call (e.g., pushing arguments on the stack and doing the CALL). An inline function in a header file has a special status, and because the header file containing the function and its definition is included in every file where the function is used, multiple definition errors will not be thrown (e.g., provided that the definition is identical in all places where the inline function is included).

In certain example embodiments, a computing system comprises processing resources including at least one processor and a memory operably coupled thereto, with the processing resources being configured to maintain a process space and execute an application in connection with the process space. At least one library is usable by, but external to, the application. A function interface is statically linked to the application and dynamically linkable to the at least one library, with the function interface being transparent to the application. The function interface is configured to at least: automatically reload the at least one library into the process space during runtime in response to a detected trigger event, without interrupting processing of the application, and while also automatically synchronizing processing threads relevant to execution of the at least one library; receive, from the application and through header file directives added to the application during compilation of the application, a call for a function of the at least one library; and responsive to reception of the call, execute the call to the function In certain example embodiments, a computing system comprises processing resources including at least one processor and a memory operably coupled thereto, with the processing resources being configured to maintain a process space and execute an application in connection with the process space. At least one library is usable by, but external to, the application. External symbols of the at least one library are statically defined at application design time and dynamically linkable to at application runtime. An interface is interposed between the application and the at least one library. The interface is configured to at least: maintain a branch table that includes, for the at least one library, an identifier of, runtime address for, and count of calls using, each callable symbol thereof; receive a change event corresponding to a detected change to the at least one library while the at least one library is loaded into the process space; and responsive to reception of the change event, (a) automatically unload from the process space the at least one library, and (b) automatically reload into the process space the at least one library, such that the at least one library is dynamically modifiable.

According to certain example embodiments, the function interface may be further configured to execute the call to the function by at least: determining whether the call is for a function already loaded into the process space; in response to a determination that the call is for a function already loaded into the process space, execute the call on the already-loaded function on behalf of the application as if the already-loaded function were statically linked to the application; and in response to a determination that the call is for a function not already loaded into the process space, dynamically load the function into the process space and then execute the call on the dynamically-loaded function on behalf of the application as if the dynamically-loaded function were statically linked to the application.

It will be appreciated that the function interface itself may be implemented as a statically linked library of the application.

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 3A-3B are example application code segments, which include details of the function declarations for an example IDFI implementation in accordance with certain example embodiments;

FIGS. 5A-5C are example source code segments for implementing an example file logger application with an IDFI in accordance with certain example embodiments.

DETAILED DESCRIPTION

Figure 1A:
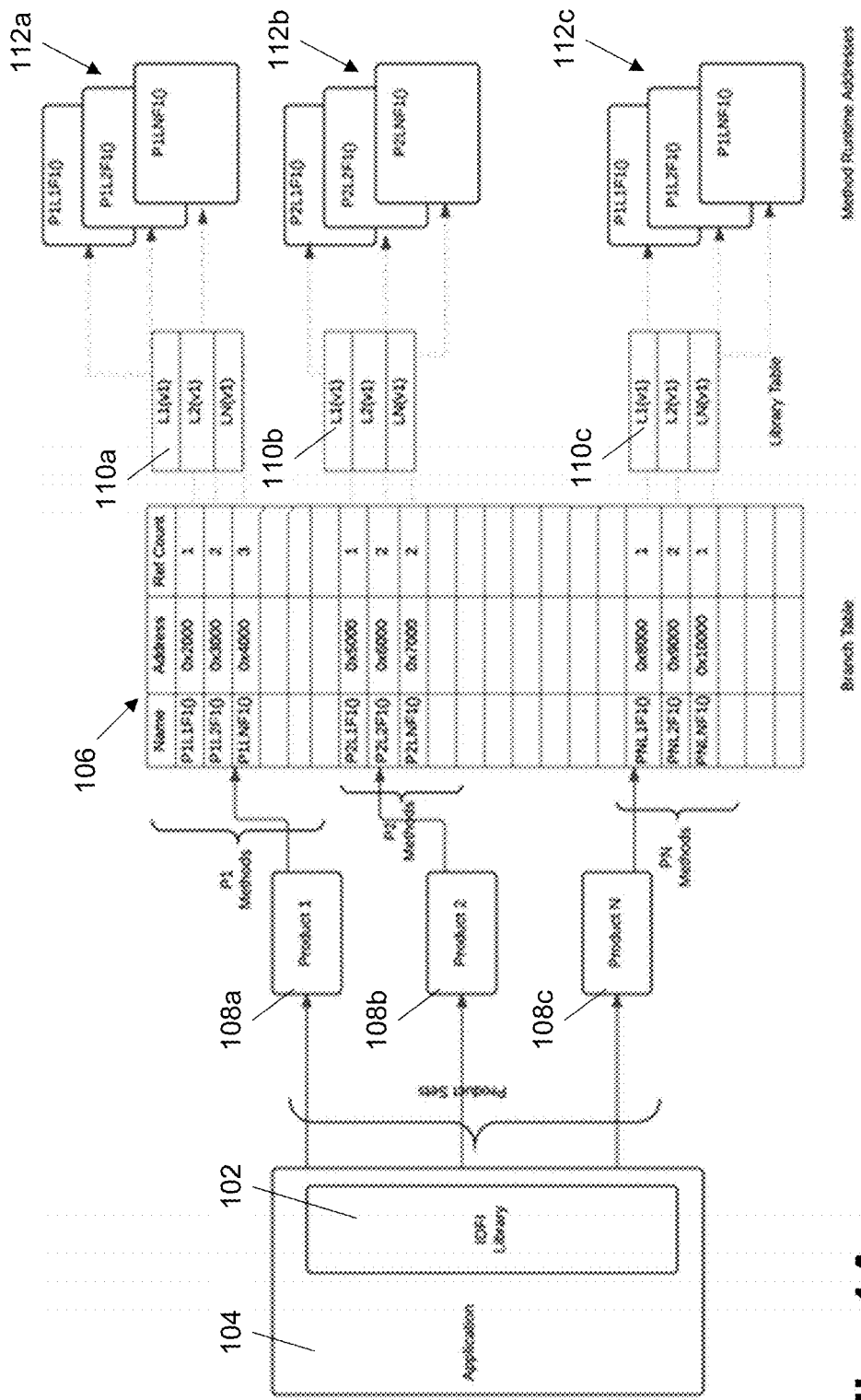
FIG. 1A is a block diagram showing an example Inline Dispatching Function Interface (IDFI) architecture, in accordance with certain example embodiments.

Certain example embodiments relate to an Inline Dispatching Function Interface (IDFI), and/or associated systems and methods. As will be appreciated from the description below, certain example embodiments leverage static linking along with deferred loading. Certain example embodiments expand inline interfaces of external library functions as part of imported header files in applications. This functional binding system in some senses behaves like middleware between the external libraries and the application. Certain example embodiments thus are advantageous in patch management, facilitate enhancement of external libraries without requiring shutting down or restarting the application, etc.

The IDFI techniques of certain example embodiments may in some cases be thought of as relating to a tiny call dispatching library that provides a mechanism to route calls from an application to corresponding external libraries without linking to these libraries during compilation. The IDFI techniques of certain embodiments may be bundled as a static library with the application as a single compilation unit. The IDFI of certain example embodiments may expand the inline definition of the external functions declared (e.g., in the header files of each of the external libraries) during compile time, and the declared functions may be resolved during runtime.

In this latter regard, in a modular programming language, pre-processing oftentimes is used to increase efficiency in calling an inline function without the normal function call overhead. In such cases, the pre-processor may create a macro to replace external library function references with inline functions, thus saving time in assembly language CALL and RETURN statements, for example. Certain example embodiments not only perform this type of pre-processing, but also work as an intermediary to take care of replacing the external library function calls with inline functions and help make the code more readable.

The techniques of certain example embodiments thus in essence use two stages for IDFI enables a new paradigm for dynamic unloading/reloading of shared libraries. The first stage uses a statically linked thin layer (the IDFI library itself), and at the same time resolves all external function calls into internal (inline) calls that are all resolved within the small IDFI library itself. One can think of an automatically created small stub of the real external function, which is all controlled, checked, and created by the standard language compiler (C, C++, Java, etc.). Then, the final loading and resolving of the external functions is performed at runtime within the IDFI library, which is all at a central place, providing all of the control for any reloading process during the lifetime (runtime) of the main application.

A programmer of an external library follows a few rules to write library header files usable by the example IDFI techniques disclosed herein, e.g., as set forth below. Certain example embodiments create branch tables during compilation for each of these libraries, and the branch table includes exported function names, runtime function addresses, and reference counts. In other words, at the beginning, certain example embodiments involve a specifically created header file, which links together with the source files of the main application. This header file "knows" (because of the definitions made by the programmer or developer) which of the function calls is externally resolved by a particular shared library. This call will, via the header file, be converted by the compiler into an inline (IDFI-compatible) function that will later at runtime call into the statically linked IDFI library. The IDFI of certain example embodiments thus can automatically pick up the name of the external shared library, as well as the real function name of the shared library.

In other words, during runtime, the IDFI of certain example embodiments performs a lookup of the library and loads the referenced symbols when the first call to the library is made from the application, adding them to the imported header file(s). For further lookup, the IDFI of certain example embodiments dispatches the function by looking up the appropriate library branch table maintaining the references. This approach helps ensure a centralized routing of all the referenced foreign library functions through the IDFI interface.

The main application will be statically linked with the IDFI library, and none of the shared libraries (that follow the IDFI convention) has to be linked with the main application. The shared libraries in this sense merely are made available in the standard library hierarchy chain in order to be picked up manually. At runtime, when a (inline) call is to be performed, certain example embodiments first enter a function within the IDFI library. IDFI then checks whether the appropriate shared library is already loaded into the main application's address space, whether all the used function addresses have been resolved, whether a reload of the shared library is pending and should happen now (e.g., before actually calling into the shared library) and, finally, if all is resolved, directly call into the shared library, passing all required parameter and taking care of the return value before returning processing back into the main application.

In this and other senses, the IDFI of certain example embodiments can dynamically on decide the loading/unloading process of external libraries, managing change events so as to help avoid errors in the execution of the application, e.g., through the use of a branch table (as described in greater detail below). For example, the IDFI of certain example embodiments can decide when to load/unload library functions and/or other symbols so that there are no references to not-yet-loaded or unloaded external functions, so that the most up-to-date version of a library function and/or symbol is being called, etc. Thus, the IDFI of certain example embodiments internally performs version management of the external libraries. For instance, in certain example embodiments, the IDFI may automatically identify newly available versions of the loaded libraries and send a notification to the application if an update is available. Once the update is acknowledged by the application, the IDFI may refresh the branch table to help ensure that the application is using the latest version of the external library, without requiring a restart of the application.

FIG. 1A is a block diagram showing an example IDFI architecture, in accordance with certain example embodiments. As shown in FIG. 1A, the IDFI library 102 is bundled with a product suite (e.g., application 104) as a single compilation unit. The IDFI library 102 contains a repository of libraries for all linked products in the application 104 in certain example embodiments.

The branch table 106 in FIG. 1A works as a lookup table for storing the state of the IDFI library 102. The branch table 106 is a dynamic table or other suitable data structure created during runtime containing the symbol name, symbol address, and symbol reference count, for each method or function or other symbol associated with the application 104, e.g., as indicated in the three columns shown in FIG. 1A. In the FIG. 1A example, the application 104 comprises three products 108a-108c, which may be different applications, different groups of features, or the like. The branch table 106 is organized so as to group together the methods for each of the products 108a-108c.

The library tables 110a-110c, linked to from the branch table 106, include the library references. Method Runtime Addresses 112a-112c refer to the addresses of every method in the process space, those methods belonging to the libraries identified via the library tables 110a-110c. As shown in FIG. 1A, the Method Runtime Addresses 112a-112c match with the symbol names in the branch table 106. Similar to as noted above, the libraries reflected in the library tables 110a-110c are grouped for the specific products 108a-108c, e.g., to help ensure the availability of the external libraries, e.g., when removing and adding the associated products 108a-108c. For example, with respect to Product 1 (represented by reference numeral 108a), the IDFI library 102 stores the required library functions for that specific product and state. It will be appreciated that tables or other structure may be used for the library tables 110a-110c.

During runtime, the IDFI of certain example embodiments reads information from the header files (or similar structure) of each external library, and determines the product and library name details, as well as the location of the related symbols, to populate the branch table 106. This may be facilitated by ensuring that IDFI-compatible libraries include an IDFI header or the like. Once the reference count in the branch table 106 drops to zero for all methods associated with a given library (e.g., indicating that that given library is no longer being used), the IDFI of certain example embodiments drops the references to that library, clears the branch table 106 entries, and unloads that library from the process space.

Figure 1B:
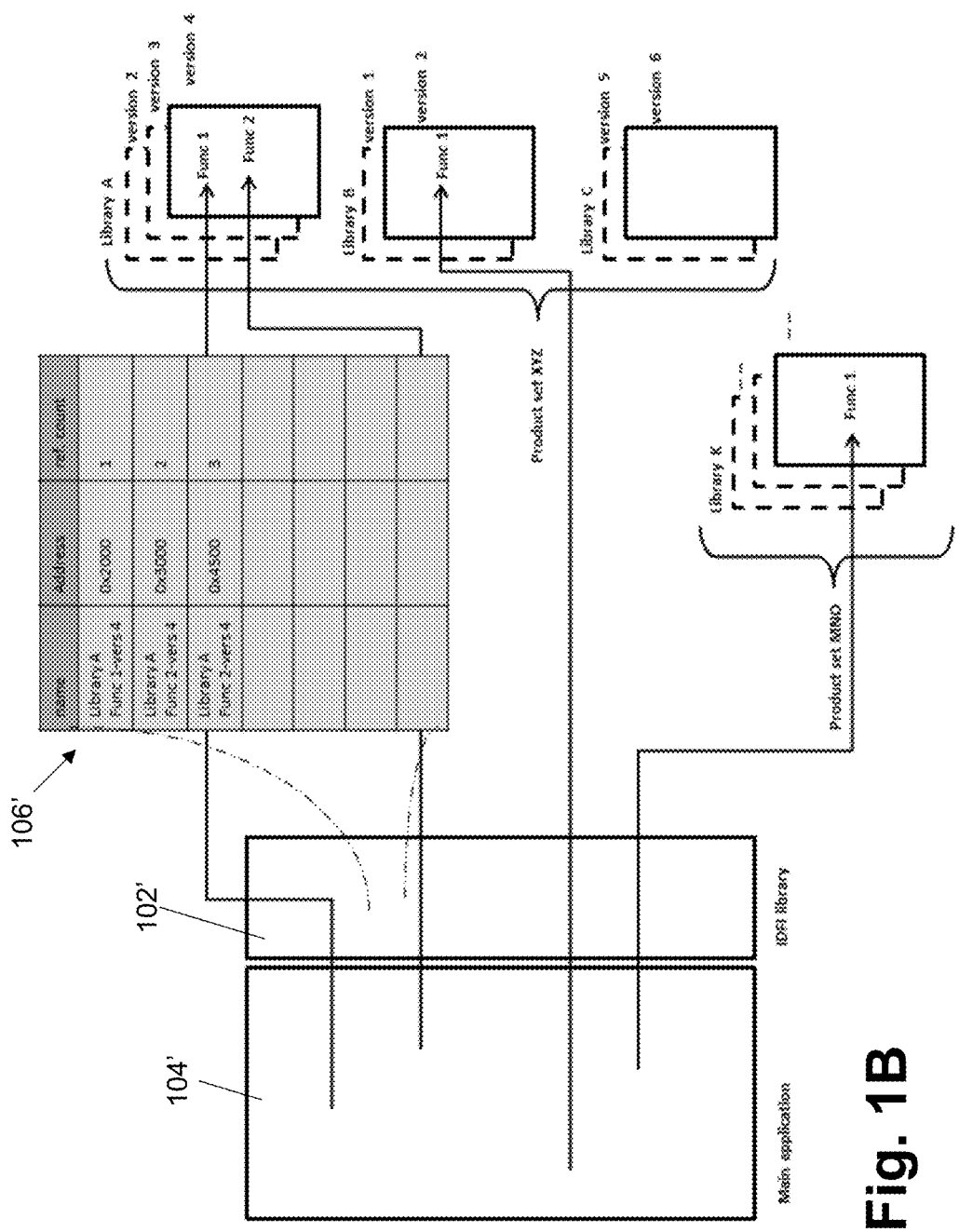
FIG. 1B is a block diagram showing another example IDFI architecture, in accordance with certain example embodiments.

FIG. 1B is a block diagram showing another example IDFI architecture, in accordance with certain example embodiments. FIG. 1B is similar to FIG. 1A. In this regard, in FIG. 1B, the IDFI library 102' is bundled with a product suite (application) 104' again as a single compilation unit. The IDFI library 102' also contains a repository of libraries for all linked products in the application. The dynamically created IDFI table(s) 106' also serves the following purposes: a lookup table stores the library state; branch tables are dynamically created during runtime, containing the symbol (e.g., function) name, address, and the reference count of how many threads are currently executing within this function; and "product" information for each shared library enables the reloading process of a complete set shared libraries (e.g., that belong to the same "product").

Because of the specific IDFI header file that is compiled together with each shared library, the IDFI library 102' will find at runtime information about the "product" group to which the specific library belongs—as well as the names of the functions that later on will be called, and other information. (See, for example, the example of the IDFI shared library header file discussed in detail below.)

Reference counters are maintained in order to keep track of the possibility to unload a specific or a set ("product") of shared libraries. The automatic reload may require all reference counts of a library/set to be zero before the reload process is executed, thereby indicating that no active thread is currently executing inside a particular library or set of libraries.

The IDFI of certain example embodiments offers a specific function (IDFI_init_state( )) to handle memory inheritance between different versions of a shared library. The processing steps of this function perform the following. Two parameters are passed to the function, namely, a size, and a pointer to an (opaque) piece of allocated storage. The IDFI of certain example embodiments function checks whether, for the particular shared library, there is already an allocated buffer available. If not, the IDFI of certain example embodiments allocates a buffer in the size of the given first parameter and returns this new buffer address to the caller. This address is also saved as part of the shared library dynamic information, created by the IDFI of certain example embodiments at runtime initialization of a new shared library (similar to the name of the library, table of function names, reference counters, etc.). If the IDFI of certain example embodiments can find an allocated buffer for the specific shared library, it returns exactly this address from the saved internal information of this library. Additional integrity checks may be performed in certain example embodiments, e.g., to help guard against runtime error situations. For example, the size of the allocated buffer may be checked and a match may be looked for, once the buffer is allocated.

Size checking and matching refers to a situation where one version of library X may use a specific layout of an opaque buffer, whereas in a future version of library X, this buffer layout may change, thus potentially leading to errors, if there were a simple blind match made. Consider the following example: "Lib X [Version 1]" i.e., the outer visible name of this library is "Lib X" without the Version part) is loaded as the first instance when the application starts. The IDFI_init_state ( ) is called with a size of 200 and an empty handle. On return from IDFI, the error code indicates that this is a fresh copy. In other words, no other "Lib X Version . . . " was executed before; thus, no dynamic reload has yet happened.

The library "maps" its own structure (e.g., a pointer to a data location is provided with a specific address). The structure may be represented as follows:

| Offset | Length | Content |
|--------|--------|---------|
| +0 | 4 | Version number |
| +4 | 12 | ID-String |
| +16 | 64 | Name |
| +80 | 120 | Log-File-Name |

During execution, Lib X would initialize the content of the above structure with: "0001", "hsdfhs27987pPlkj", "Test Library", "C:\our_logfile.txt". Now, assume that a reload happens, and this version of the library is "Lib X [Version5]". On reload, the library calls IDFI_init_state with a size of 200. If it was not 200, then the IDFI of certain example embodiments could already return a specific error code, indicating that this feature is not suitable in this situation, because a mapping of the opaque data buffer will not work (as the current size would not match the prior size of 200). In any event, because the sizes are the same in this example, the IDFI of certain example embodiments now returns the pointer to the already filled data portion. But because of the development time in between, assume that the new "Lib X [Version 5]" uses this different layout:

| Offset | Length | Content |
|--------|--------|---------|
| +0 | 4 | Version number |
| +4 | 12 | ID-String |
| +16 | 64 | Name |
| +80 | 20 | Password |
| +100 | 100 | Log-File-Name |

When coded correctly, "Lib X [Version 5]" now first has to check the compatibility of the returned structure address. For example, the second version of the buffer layout should use a Version number of, for instance, "0002". By comparing the first four bytes of the opaque buffer (or using a similar technique), the library is able to see that the current buffer layout (version 0001) does not match its own (version 0002). It thus will be appreciated that any "blind" mapping could cause problems, as in this instance (for example) the Log-File-Name would be truncated and therefore wrong.

Certain example embodiments may offer buffer handling for each library so that it is able to store its global handles/ variables. During the default loading of the libraries, certain example embodiments can check for an existing IDFI buffer and initialize the respective handles. For example, the IDFI of certain example embodiments may allocate a buffer for each library, where the current state of the variables and global handles are to be stored. The buffer may be located within the functions exposed by the external libraries in certain example embodiments. For example, an external library function may maintain an incremental counter like the one shown below:

"Version 1. Counter=1"
"Version 1. Counter=2"
"Version 1. Counter=3"
.
.
.
"Version 1. Counter=80"
"Version 1. Counter=81"
{Library reloaded with Version 2}
"Version 2. Counter=82"
"Version 2. Counter=83"
.
.
.
"Version 2. Counter=96"

In the above example, the main application is started and a shared library is invoked. This corresponds to the version 1 counters 1 through 81. The library reload in this example may correspond to, for example, the shared library being replaced within its original directory, where it has been loaded from at process initialization. An event is fired off to indicate a possible reload situation for this library. Note the different version and the counter variable, which does not start—as one might expect—with "1" again. During all of this processing, the main application continues to run. The main program terminates only after the version 2 counter reaches 96.

The following is an example code snippet for a main application. The main( ) function below is a file logging application used to log the status of the library state. In the main( ) function, MyLogFile.txt is the name of the log file associated with the application.

```
void main( ) //File logging app used to log the status of the library state.
{
  int i;
  lib_init_logfile("MyLogFile.txt");//
  lib_init_loglevel(3);
  for (i = 0; i < 100; i++)
  {
    lib_log_msg("This is some ordinary message", 1);
    ...
    lib_log_msg("this is more important", 3);
    ...
    lib_log_msg("And this needs to be checked ALWAYS", 6);
  }
}
```

The following is an example code snippet for the library lib_log. The initial call from IDFI( ) function in this example will always be invoked by the IDFI of certain example embodiments, when the library is loaded. This could be done by convention, or made optional, e.g., where the IDFI of certain example embodiments searches for the name.

```
struct stateBuffer {
  int logLevel;
  char[265] logFileName;
  int counter;
} SB;
file *fp_logFile = NULL;
int initial_call_from_IDFI( )
{
  stateBufferSize = sizeof(stateBuffer);
  // Now we will call IDFI to maintain the state buffer
  //
  // In IDFI_init_state, IDFI will check if any version of this library
  // already allocated such a buffer (e.g., based on a size check). If not,
  // it will initialize it with zero, else it will return the already
  // allocated structure.
  err = IDFI_init_state(stateBufferSize, (void*)SB);
}
int lib_init_logfile(char *fileName)
{
  strncpy(SB.logFileName, fileName);
  if (fp_logFile == NULL) {
    fp_logFile = fopen(fileName, "a");
  }
}
int lib_init_logLevel(int logLevel)
{
  SB.logLevel = logLevel;
}
int lib_log_msg(char *some_Text, logLevel)
{
  if (logLevel >= SB.logLevel)
  {
    // If this library was re-loaded after the call to lib_init_logFile( )
    // the logfile will be reopened, again at this point.
    if (fp_logFile == NULL)
    {
      lib_init_logFile(SB.logfileName);
    }
    // Perform tracing and increment the line number counter
    len = fprintf(fp_logFile, "count: %d (level=%d) -> \"%s\"",
        SB.counter++, logLevel, some_Text);
  }
}
```

As alluded to above, the IDFI_init_state( ) function captures a snapshot of the state of the file logger with the log file, log file level, and counter information. When there is a transition to a new version of the file logger library, the IDFI_init_state( ) function maps to the global handle and retrieves the last logging information and continues to increment the counter. For instance, keeping with the example above, the following sequence might occur: "Version 1. Counter=81"; {Library reloaded with Version 2}; "Version 2. Counter=82". Between 81 and 82, a new version of the library in the load library directory of the process was recognized by the eventing system. The reload takes place without stopping the main application.

It will be appreciated that the code snippets above are provided by way of example and are non-limiting in nature unless specifically claimed. Other source code languages, functions, etc., may be used together with, or in place of, the example code snippets above.

Example Implementation

Details concerning an example implementation are provided below. It will be appreciated that this example implementation is provided to help demonstrate the concepts of certain example embodiments, and aspects thereof are non-limiting in nature unless specifically claimed. For example, descriptions concerning the relative arrangement of the various architectural components, the code snippets, etc., are non-limiting in nature unless specifically claimed. Similarly, tables may be implemented as arrays, linked lists, and/or other structures.

Figure 2:
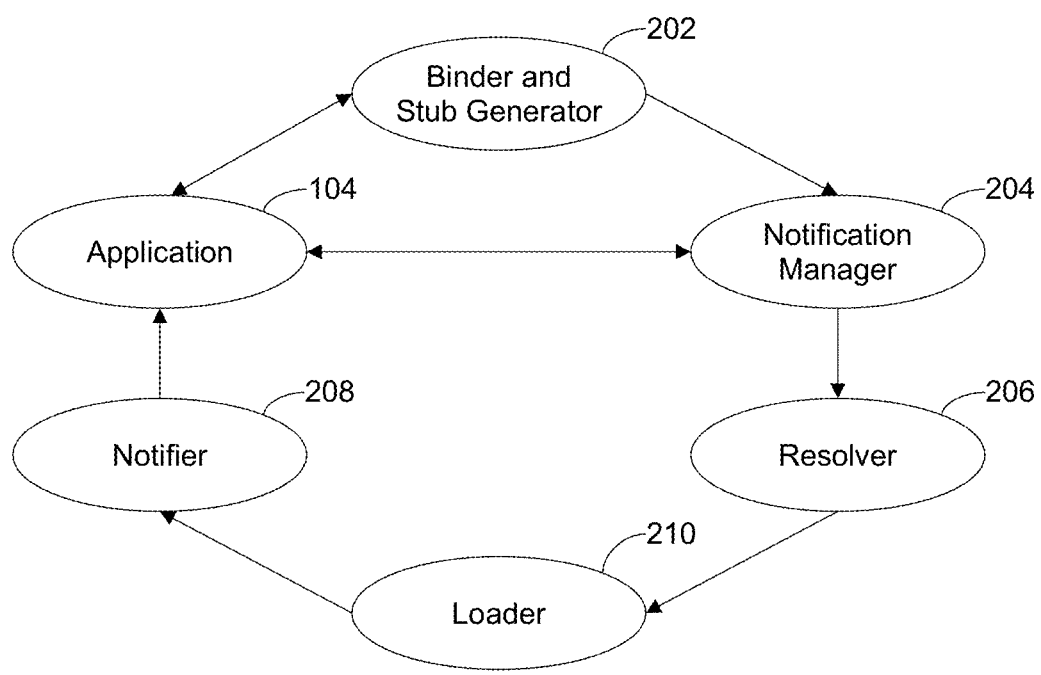
FIG. 2 is a block diagram showing internal architectural components of the IDFI of certain example embodiments.

FIG. 2 is a block diagram showing internal architectural components of the IDFI of certain example embodiments. The binder and stub generator 202 generates the binders and stubs, thereby creating a way to route a function call to the referred external library function during lookup.

For example, a function "create( )", which exists in the external library and which is invoked by the application will be "overridden" by the header file directives and "redirected" to pass through IDFI in certain example embodiments. The following definition would, for example, be created automatically in the header filet that needs to be used with the (re-)compilation of the (unchanged) application source code:

```
STATIC_INLINE ret_type create {\
        ret_type err = MA_OK;\
err = idfi load library ( d_module,
                product,
                library,
                version,
                (const char**)fnt,
                fat,
                fnt_size);\
if(*fat) {\
    err =   (*fat)->function##_fn ?
            (*fat)->function##_fn arg :
            MA_ERROR_DISPATCHER_INVALID_MODULE;\
    }
    (void)idfi unload library (product, library);\
    return err;\
}
```

The interfaces of external libraries comply with IDFI rules, thus allowing pre-processing in the application 104 where the headers are imported to generate the stubs and binders. Because external function calls are resolved and redirected through a central place (the IDFI static library of certain example embodiments), stubs replace the original function calls and are bound to the new IDFI infrastructure. This task is mainly implemented with the help of the IDFI template header file (described in greater detail below). The binder and stub generator 202 thus is in communication with the application 104, and vice versa. In brief, it is noted that header file directives added to the application during compilation of the application may define how calls from the application to the at least one application are to be handled through the function interface. The header file directives may be generated based on input provided by a developer, e.g., from templates completed by a developer of the application without requiring the developer to modify other source code of the application.

The binder and stub generator 202 also is in communication with the notification manager 204, which provides notifications of events or state changes, e.g., to cause the reloading of a dependent library. The IDFI of certain example embodiments maintains a snapshot of the version information of different foreign libraries, which helps in selective roll-backs, upgrades with the latest foreign library patch, and/or other situations.

For generation of the reload events, a standard event helper library (for example, libuv described at http://docs.libuv.org/en/v1.x/) can be used. This library typically starts a new thread that continuously checks certain status information such as, for example, whether a particular file (in this case a shared library) is replaced or modified inside a specific directory. It will be appreciated that this is only an example of how a reload event can be created and used within the IDFI infrastructure of certain example embodiments. Other possible events could include, for example, explicit creations of the reload event by an administrator indicating manually which libraries are predetermined for a reload process, etc.

As explained above, the IDFI of certain example embodiments maintains a separate data structure to store the runtime address for each symbol reference of the external library. During the compilation of the application 104 using the new headers of the external libraries, the IDFI of certain example embodiments creates a static array of function pointers or other structures and stores them as part of the header file. This data structure may be thought of as a Function Address Table (FAT), which is a table or other structure including function addresses.

Initially, the addresses of all of the foreign function methods of the FAT are set to NULL. During runtime, upon resolving the foreign library, the IDFI of certain example embodiments populates the symbols' runtime addresses and stores them exactly in the same order sequence as defined in a Function Name Table (FNT), which may be thought of as a table or other structure including function names. The resolver 206 shown in FIG. 2 may aid in these and/or other functions.

Consider, for example, a library LIB1 that exports or exposes four functions, namely, "create", "set", "get", and "release". In this example, the Function Name Table would have the following C structure or the like:

```
static char fnt[ ][MAX_NAME] = {
        "create",
        "set",
        "get",
        "release"
};
```

In this example, the Function Address Table would result in the following C structure or the like:

```
struct functionAddressTable {
        void (*create_fn)(object **o);
        void (*set_fn) (const char *value);
        const char* (*get_fn)(void);
        void (*release_fn)(object *o);
};
static struct functionAddressTable fat;
```

The corresponding Function Address Table during runtime would then at least initially appear as follows:

```
fat {
        NULL,
        NULL,
        NULL,
        NULL,
};
```

The IDFI of certain example embodiments loads the external library and resolves the external symbol references by iterating through the Function Name Table entries and storing the runtime address, e.g., as shown below in the C implementation example:

```
IDFI_load(const char *library_name, const char *fnt, int fnt_size, struct functionAddressTable **fat) {
    Handle = dl_open(library_name);
    if(Handle) {
```

```
        void **sym_set = (void*)calloc(fnt_size, sizeof(void*));
        if(sym_set) {
            for(int i = ( ); i < fnt_size; ++i) {
                sym_set[i] = dl_sym(handle, fnt[i]);
            }
            *fat = sym_set;
        }
        instance->save(library_name, handle);
    }
}
```

The following is example application code. As can be seen, the IDFI initialize( ) function is run, an object is declared inline, created, released, and then the IDFI Deinitialize( ) function is run at the end of the example application code.

```
#include "myapp.h"
int main( ) {
    IDFI_t handle = IDFI_initialize(run_time_path, deployment_path);
    Object_t *o;
    create(&o);
    release(o);
    IDFI_Deinitialize(handle);
}
```

FIGS. 3A-3B are example application code segments, which include details of the function declarations for this example implementation. The first 12 lines of FIG. 3A correspond to an example standard header file for the above example application. The inclusion of the additional instruction—#include "object_idfi.h"—is noteworthy, here. An example of the header file object_idfi.h, which is delivered in the form of a template, follows. Certain parts are fixed and are determined by the way that the static IDFI library expects certain definitions. These parts of the header file definition on in normal text character set. The other, variable part of the header file are completed by the programmer or developer, who has knowledge about the external shared library. The programmer or developer knows, for example, which functions are exported and used at runtime by a main application and what their signature is. In this regard, in the example shown in FIGS. 3A-3B, the bolded text is part of the IDFI bundle, and the italicized text is added in the external library by the library programmer or developer. It will be appreciated that this corresponds to an example of a minimal set of changes made in order to enable the techniques of certain example embodiments to be implemented. In this regard, one header file is created for each external library. Some terms may have to be typed and specified exactly once ("PRODUCT"), whereas other lines may need to be copied for each function (e.g., IDFI_ARG_EXPANDER(error_t,create,(object_t**o),(o))). Those skilled in the art also will understand the relevance of certain code fragments based on the "comments" embedded in these drawings.

During pre-processing time, a macro or other processor may be used to generate definitions for all of the exported functions. For instance, an IDFI stub generator macro of the type shown below may be used in certain example embodiments:

```
#define IDFI_STUB_CREATOR(version, product, library,
    library_version, d_module, ret_type, function, signature,
    arg, fnt, fat, fnt_size)\
```

```
    STATIC_INLINE ret_type function signature {\
        ret_type err = MA_OK;\
        err = idfi_load_library(\
            d_module, product, library, version,\
            (const char**)fnt, fat, fnt_size);\
        if(*fat) {\
            err = (*fat)->function##_fn ?\
            (*fat)->function##_fn arg :\
            MA_ERROR_DISPATCHER_INVALID_MODULE;\
        }
        (void)idfi_unload_library(product, library);\
        return err;\
    }
```

It is noted that the #define statements may be processed by the macros. Compilation of the main application may automatically change the static calls to external functions in the application code into calls to IDFI helper calls, which at runtime make the corresponding functions dynamically loadable.

Those skilled in the art will understand that this helps explain how the redirection of the function calls in the main application may be implemented in accordance with certain example embodiments. That is, certain example embodiments involve generating a "fake" function with the same name (here, using a static inline technique, which is advantageous from a speed perspective). This function will then, at runtime, direct the IDFI of certain example embodiments to load and execute the "real" function.

It will be appreciated that this (or similar) code may form a part of the IDFI bundle in certain example embodiments.

The IDFI of certain example embodiments creates the branch table entries with a symbol name and address as fields. The following table shows the branch table creation, when the application is compiled and thus with initial symbol address details.

| Symbol | Address | Reference Count |
|---|---|---|
| Create | NULL | 0 |
| Set | NULL | 0 |
| Get | NULL | 0 |
| Release | NULL | 0 |

The application is responsible for initializing the IDFI instance in certain example embodiments. During construction of the IDFI static instance, the branch table will be created, and a watcher thread will be started (as described earlier for the eventing mechanism, for example using libuv) to watch the deployment path. IDFI will then internally read the exported symbols of the library from the header file. This relates to the fact that there typically is one or many paths (e.g., specific folders in a file system) that is/are specified as the "library path" or "load library path", etc. In certain example embodiments, the operating system loader may use these paths (e.g., folders), in exactly the given sequence, to search for a specific module to be loaded which, in this case, is the external library. In certain example embodiments, it will exist in a specific folder and if it is changed, libuv or the like will create a notification. In the example discussed herein, <myapp.h> creates all entries in the branch table filled with the symbol name, address, and reference count. Before any symbols are referenced from the application, the branch table symbol addresses are initialized to NULL (e.g., as indicated in the table above).

Once the IDFI instance is created successfully, then the function "create" is executed. The IDFI of certain example embodiments first dispatches the call to the internal inline stub that was created as part of the header file. The following or similar code may be used in this regard:

```
inline error_t create(object_t **o) {
    ret_type err = OK;
    err = idfi_load_library(d_module,
                            product,
                            library,
                            version,
                            (const char**)fnt,
                            fat,
                            fnt_size);
    if (*fat) {
        err = (*fat)->create_fn ?
              (*fat)->create_fn(o) :
              IDFI_ERROR_INVALID_MODULE;
    }
    (void)idfi_unload_library(product, library);
    return err;
}
```

In the above stub, the IDFI of certain example embodiments loads the external library (which in this instance is "libobject"), reads the symbols of the library, and populates the address of the symbols in the branch table. The branch table thus will be updated in accordance with the following:

| Symbol  | Address | Reference Count |
|---------|---------|-----------------|
| Create  | 0x23000 | 1               |
| Set     | 0x24000 | 0               |
| Get     | 0x25000 | 0               |
| Release | 0x26000 | 0               |

Once the symbols are loaded, the IDFI of certain example embodiments dispatches the call to the correct foreign library function (create( )) and increments the reference count. On return from the create( ) function call, the IDFI of certain example embodiments decrements the reference count by calling idfi_unload_library( ). Among other things, calling idfi_unload_library( ) checks whether the references of the symbols referred from the foreign library are dropped and, if so, then the IDFI of certain example embodiments unloads the library from the process space.

Referring once again to FIG. 2, the notifier 208 enables the IDFI of certain example embodiments to provide a hook to the application. That is, the notifier 208 can set call-backs to provide a notification of a new version, hot fix, or the like, for the external libraries that are available in the deployed path.

The application 104 can register a call-back during IDFI initialization by calling the IDFI_register_callback( ) function. An example call-back function is as follows:

```
struct IDFI_callbacks_s {
    void (*on_change)(IDFI_t *handle, char *delta_libs, int *acceptance, int
        *delay);
};
error_t IDFI_register_callbacks(IDFI_t *handle, IDFI_callbacks_t
    *callbacks);
```

In this example code, the on change( ) call provides the application 104 with details of changes in the external libraries and provides the application's acceptance flag, which may be used to express the application's interest in reloading of the libraries. Alternatively, or in addition, a parameter in the application 104 may be set for deferring reloading of the application. If no call-back is registered, the IDFI of certain example embodiments reloads the newest libraries. In this regard, it will be appreciated from FIG. 4 discussed below that the IDFI of certain example embodiments may be further configured to perform synchronization of processing threads relevant to the execution of the library during automatic reloading of the library. The synchronization might include at least temporarily deferring calls to the library, and/or other associated activities.

The loader 210 is responsible for loading and unloading external libraries during runtime. The loader 210 also closely monitors the branch table. For example, if all references to a library are dropped, the loader 210 dynamically unloads the external library and frees the associated process space. The IDFI of certain example embodiments may internally organize the branch table by grouping and loading all of the associated libraries of an application 104 and/or associated product (e.g., as shown visually in FIG. 1A and FIG. 1B). It will be appreciated that this arrangement is advantageous for a number of reasons. For example, it will be appreciated that this arrangement may make the loader more efficient, e.g. as it can move linearly from reference-to-reference within a given library and quickly determine whether there are any left. Furthermore, in certain example embodiments, IDFI may load all symbols at once, when a new library is (re-)loaded. Thus, any second call into this library (even if the function is called for the first time) will have the address ready and can directly be passed to this function. Furthermore, libraries can be grouped by IDFI PRODUCT NAME or the like. Thus, for example, when all libraries for a given product are identified as showing an error, all of these libraries can be flagged for an upcoming re-load.

Figure 4:
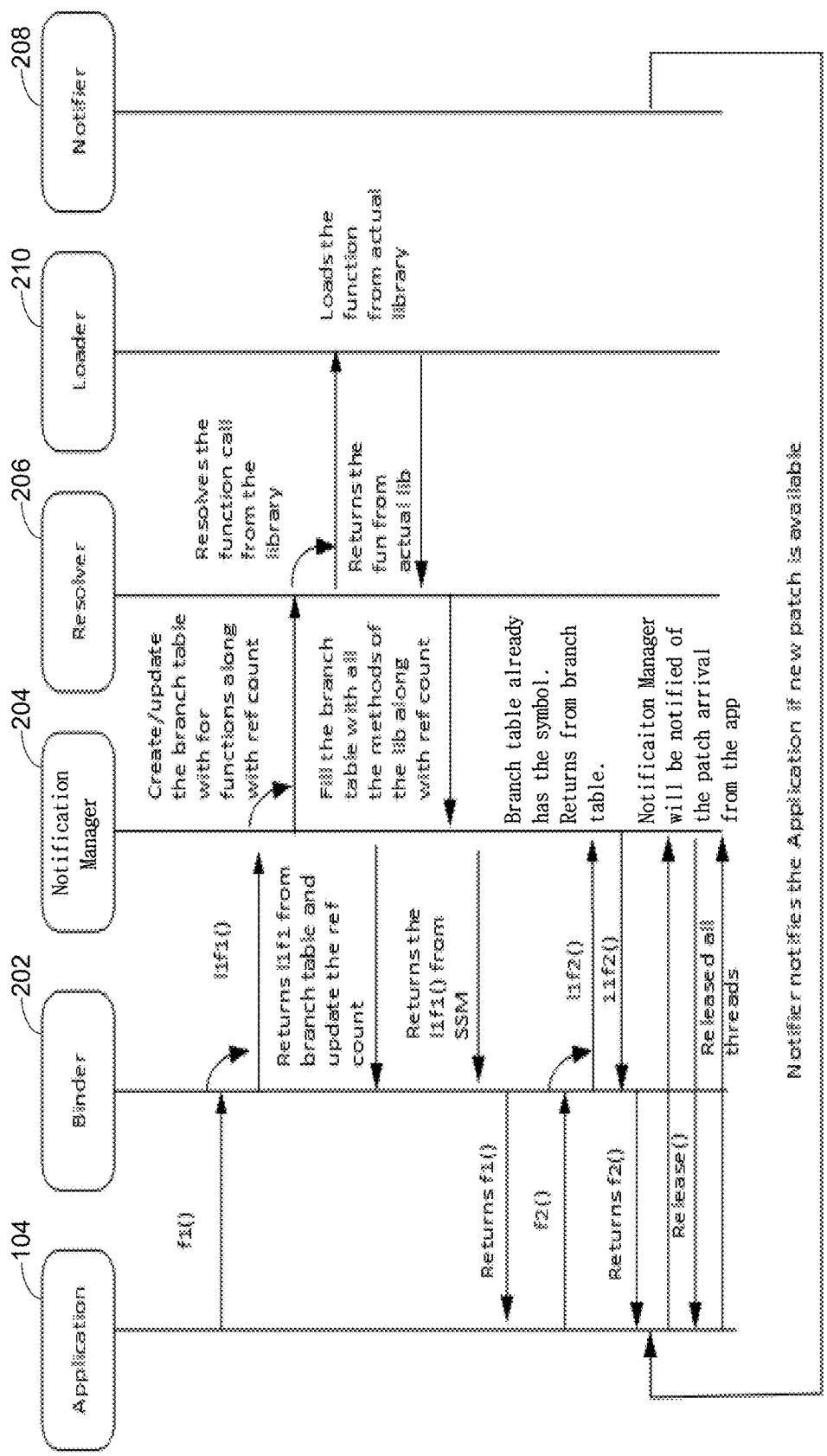
FIG. 4 is an example call flow diagram, demonstrating how the FIG. 2 example components may be used in a common application execution scenario in certain example embodiments.

FIG. 4 is an example call flow diagram, demonstrating how the example FIG. 2 components may be used in a common application execution scenario in certain example embodiments. While compiling an application 104 that refers to a particular external library function (f1) from the imported headers, the IDFI of certain example embodiments generates stubs that look exactly like the foreign library functions with the definition. The stub also contains details about how to load a particular library and lookup particular symbols.

During runtime, notification manager 204 of the IDFI of certain example embodiments creates a branch table for the library (L1) and loads all the symbols and references of that external library and stores the symbol address into the imported header file. The IDFI of certain example embodiments maintains the references in the branch table using the resolver 206 and loader 210. Any further lookup of a library (L1) function (f2) will search the symbol table of the imported header file. Thus, the IDFI of certain example embodiments allows for a constant lookup time of O(1) and does not necessarily need to look-up libraries again because of the symbol table. It will be appreciated that the events that trigger the reloading can be flexibly defined. Flexible configuration functionality may be provided in connection with a configuration file, accessible to the IDFI layer, which runs in the application process. The configuration file may specify that the IDFI of certain example embodiments be implemented to identify a modification of the external library. For example, libuv should detect that the Modified Time Stamp for a specific library has changed and that a signaling event should be created. Alternatively, or in addition, flexible configuration may be implemented via manual commands that create the event for the IDFI to signal that a specific library should now be reloaded. In a typical scenario, these events can be fired off, when a version of a shared library is replaced with a newer version within the directory where it originally was loaded from. Thus, it will be appreciated that trigger/change events may include a change to the library itself, a manual reload of the library, and/or the like. Changes to the library may include, for example, an update to it or a part of it, deployment of a new version of the library, etc.

On any foreign library version update, the IDFI notifier 208 notifies the application 104 and refreshes the branch table by reloading all the symbols and releasing all the old references by deleting the old entries in branch table for (f1).

FIGS. 5A-5C are example source code segments for implementing an example file logger application with an IDFI in accordance with certain example embodiments. The external library is called "ma_logger" and has two functions "ma_file_logger_create" and "ma_file_logger_release".

It will be appreciated that the branch tables or other structures of certain example embodiments may include the shared library names, all of the used function names of each particular shared library, and status flags, versions, and means to help in synchronizing multiple threads calling into one shared library at the same time. These tables may be dynamically created by the very structure and layout of the header file. For example, the compile step of the main application may automatically create these appropriate tables, which are used by the IDFI library in certain example embodiments.

The IDFI of certain example embodiments provides a number of advantages. For example, the IDFI of certain example embodiments is programmed for multi-product support. That is, certain example embodiments may incorporate the IDFI when there is a suite of products to modify (e.g., apply fixes) to one product without affecting the other products, and potentially accomplishing this without requiring a restart. As indicated above, there may be minimal downtime, e.g., when rolling out fixes or enhancements through external library functions. Easy rollbacks also may be possible. Altogether, this may lead to better patch management. Because there is faster call management (e.g., because of the O(1) lookup), performance can be enhanced. Similarly, the IDFI of certain example embodiments provides for an efficient library loading and unloading mechanism, e.g., with optimized or at least improved process space management. Advantageously, in some instances, the IDFI of certain example embodiments locks the application only once for populating the branch table with the library symbols for each library.

Use cases may incorporate some or all of the previously mentioned and/or other features, for example, to extend and/or otherwise build upon the techniques mentioned here. An application such as, for example, an enterprise messaging application will internally contain different sets of external libraries that include logging library, event library, scheduling library, etc. When one library (e.g., a logging library), needs to be updated with a new enhancement, the messaging application would need to be restarted, creating a potentially adverse business impact in view of application downtime, in a conventional implementation. Using the IDFI of certain example embodiments, however, allows easy library version management and can reduce or even help do away with the downtime associated with deploying fixes and enhancements.

The IDFI of certain example embodiments may include the additional features in order to provide a workable solution and an easy transition from the old, standard type of library handling. First, certain example embodiments may embed an eventing library (for example, libuv, as noted above). This additional library may watch for specific events that may happen with the shared libraries of a main application. Generally, it will check for any replacements of the shared libraries and will then internally fire off an event to IDFI, signaling that a new version of a particular shared library is available. This, of course, is only one embodiment of event that is supported. A triggering event also could be fired off by some manual event (by an administrator) or any other automatic event that seems plausible, when determining that a reloading of a Shared Library should take place.

Second, a selective automatic and manual approach to actually perform the reloading of the shared library at runtime may be provided. When receiving the event to reload a shared library by the eventing library, the automatic processing may check if any running thread is currently performing a call in the shared library in question. If not, certain example embodiments may reload the shared library immediately and refresh the internal function table (e.g., resolve its function addresses again). On the other hand, manual processing may call a callback function of the main application, indicating that a reload event has been fired off. On successful return of this function, certain example embodiments may perform the reload, plus the function name resolution. Otherwise, the reload may be postponed until the main application is ready and signal the manual reload at a later stage.

Third, a unique way of inheriting data between the old and new versions of a shared library may be provided in certain example embodiments. Typically, shared libraries have initialization routines and routines that keep specific state information within their own private data structures/variables. When a reload of such a library happens, the initial and state information might be lost. In such cases, the main application would have to call such functions again, e.g., so that the same state is reached by the time of the reload event. This would be a burden for the main application, potentially forcing code changes and other non-trivial tasks in order to support the new IDFI paradigm. Certain example embodiments are able to avoid this by providing a special memory allocation function. For instance, in certain example embodiments, each shared library can call the IDFI to retrieve one opaque memory buffer of a specific size. This may happen at the loading/reloading stage of the shared library. When this function (called IDFI_init_state( )) as described above) is called, the IDFI of certain example embodiments first checks whether the buffer is already allocated. If not, it allocates this buffer and returns the call together with the address of this buffer. If the buffer is already allocated, the IDFI of certain example embodiments will return an appropriate response and return the buffer, which now already contains state and other important information for the newly reloaded library. This will make the reload process transparent for the main application, because no additional calls or care has to be provided in order to maintain the integrity of the whole application, and processing can continue without any specific care by the main application.

As will be appreciated from the above, the IDFI of certain example embodiments advantageously enables functionality including: the rollout of fixes to the application without requiring a restart; the selective roll-back to a different version of the external library (e.g., without requiring a restart); selective rollout of updates for a selected subset of applications in a suite of applications (e.g., without requiring a restart); the runtime loading of external libraries, reducing the time taken to compile; process space management via deferred loading/unloading of libraries at runtime; and/or the like.

Although certain example embodiments have been described in connection with functions or methods, it will be appreciated that the techniques disclosed herein may be used in connection with other symbol types. In certain example embodiments, the branch table may be told to persist global values or the like, and they may be persisted across library versions. This may be accomplished by mapping to an internal structure, e.g., by providing a pointer to an address.

Although certain example embodiments have been described herein as maintaining counters for individual symbols, it will be appreciated that a counter may be provided at the library level. For instance, in certain example embodiments, a counter may be a global value of a library, provided on a per-library basis. The branch table may be told to persist these global values instead of or in addition to symbol-level counters. In certain example embodiments, as above, these global values may be persisted across library versions.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computing system, comprising:
processing resources including at least one processor and a memory operably coupled thereto, the processing resources being configured to maintain a process space and execute an application in connection with the process space;
at least one library usable by, but external to, the application,
a function interface statically linked to the application and dynamically linkable to the at least one library, the function interface being transparent to the application and configured to at least:
load the at least one library and execute function calls for at least one function of the at least one library in response to received function calls from the application that is being executed in connection with the process space;
record, to a maintained data structure, data for instances of use of the loaded at least one library for the received function calls;
based on the maintained data structure and how data for instances of use of the at least one library are recorded therein, automatically reload the at least one library with a different version into the process space during runtime in response to a detected trigger event, without interrupting processing of the application, and while also automatically synchronizing processing threads relevant to execution of the at least one library;
receive, from the application and through header file directives added to the application during compilation of the application, a call for a function of the at least one library with the different version; and
responsive to reception of the call, execute the call to the function.

2. The system of claim 1, wherein the function interface is further configured to execute the call to the function by at least:
determine whether a function call is for a function already loaded into the process space;
in response to a determination that the function call is for a function already loaded into the process space, execute the function call on the already-loaded function on behalf of the application as if the already-loaded function were statically linked to the application; and
in response to a determination that the function call is for a function not already loaded into the process space, dynamically load the function into the process space and then execute the call on the dynamically-loaded function on behalf of the application as if the dynamically-loaded function were statically linked to the application.

3. The system of claim 1, wherein the function interface is implemented as a statically linked library of the application.

4. The system of claim 1, wherein the header file directives added to the application during compilation of the application define how calls from the application to the at least one application are to be handled through the function interface.

5. The system of claim 4, wherein the header file directives are generated based on input provided by a developer.

6. The system of claim 4, wherein the header file directives are generated from templates completed by a developer of the application without requiring the developer to modify other source code of the application.

7. The system of claim 1, wherein detectable trigger events include a change to the at least one library itself and a manual reload of the at least one library.

8. The system of claim 7, wherein changes to the at least one library include an update to the at least one library or a part thereof and deployment of a new version of the at least one library.

9. The system of claim 1, wherein the maintained data structure includes a branch table that includes, for the at least one library, an identifier of, runtime address for, and count of active calls to, each callable symbol thereof.

10. The system of claim 9, wherein the function interface is further configured to unload from the process space the at least one library in response to reception of the detected trigger event and the branch table indicating that the count of active calls to each symbol thereof is 0.

11. The system of claim 10, wherein the function interface is further configured to perform the synchronization during the automatic reloading.

12. The system of claim 11, wherein the synchronization at least temporarily defers calls to the at least one library.

13. A method of operating the system of claim 1.

14. A method of configuring the function interface in the system of claim 1 at design time for use at runtime.

15. The computing system of claim 1, wherein the processing resources are further configured to:
in connection with the at least one library that is loaded, create a state buffer that stores state information for the at least one library,
in connection with the reload of the at least one library with a different version, map the loaded different version of the at least one library to the created state buffer for reading or writing state information therein.

16. A computing system, comprising:
processing resources including at least one processor and a memory operably coupled thereto, the processing resources being configured to maintain a process space and execute an application in connection with the process space;
at least one library usable by, but external to, the application, wherein external symbols of the at least one library are statically defined at application design time and dynamically linkable to at application runtime; and
an interface transparently interposed between the application and the at least one library, the interface being configured to at least:
maintain a branch table that includes, for the at least one library, an identifier of, runtime address for, and count of calls using, each callable symbol thereof;
receive a change event corresponding to a detected change to the least one library while the at least one library is loaded into the process space; and
responsive to reception of the change event and based on the maintained branch table, (a) automatically unload from the process space the at least one library, and (b) automatically reload into the process space the at least one library, such that the at least one library is dynamically modifiable.

17. The system of claim 16, wherein the interface is further configured to at least defer the automatic unloading until the branch table indicates that the at least one library can be unloaded safely.

18. The system of claim 17, wherein the branch table indicates that the at least one library can be unloaded safely when the each callable symbol has a count of calls equal to 0.

19. The system of claim 16, wherein the automatic unloading clears the branch table and the automatic reloading re-populates the branch table.

20. The system of claim 16, wherein the interface is further configured to at least:
receive, from the application, a call for a symbol of the at least one library;
responsive to the received call, determine whether the at least one library associated with the called symbol is already loaded into the process space;
in response to a determination that the at least one library associated with the called symbol is already loaded into the process space, obtain the runtime address for the called symbol from the branch table, and execute the call to the called symbol using the runtime address obtained from the branch table; and
in response to a determination that the at least one library associated with the called symbol is not already loaded into the process space, dynamically load the at least one library into the process space, populate the branch table with the callable symbols from the dynamically loaded at least one library, and execute the call to the called symbol.

21. The system of claim 16, wherein the automatic unloading and automatic loading are performed without prompting an application restart.

22. A method operating the system of claim 16.

23. A method of configuring the interface in the system of claim 16 at design time for use at runtime.

24. A non-transitory computer readable storage medium tangibly storing instructions that, when executed by processing resources including at least one processor and a memory operably coupled thereto, are configured to operate, in connection with an application executed in a process space, a function interface statically linked to the application and dynamically linkable to at least one library that is usable by but external to the application, by performing functionality comprising:
loading the at least one library and execute function calls for at least one function of the at least one library in response to received function calls from the application that is being executed in connection with the process space;
recording, to a maintained data structure, instances of use of the at least one library for the received function calls;
based on the maintained data structure, automatically reloading the at least one library with a different version into the process space during runtime in response to a detected trigger event, without interrupting processing of the application, and while also automatically synchronizing processing threads relevant to execution of the at least one library;
receiving, from the application and through header file directives added to the application during compilation of the application, a call for a function of the at least one library with the different version; and
responsive to reception of the call, executing the call to the function,
wherein the function interface is transparent to the application.

25. A non-transitory computer readable storage medium tangibly storing instructions that, when executed by processing resources including at least one processor and a memory operably coupled thereto, are configured to operate, in connection with an application executed in a process space, an interface interposed between the application and at least one library usable by but external to the application, by performing functionality comprising:
maintaining a branch table that includes, for the at least one library, an identifier of, runtime address for, and count of calls using, each callable symbol thereof, wherein external symbols of the at least one library are statically defined at application design time and dynamically linkable to at application runtime;
receiving a change event corresponding to a detected change to the least one library while the at least one library is loaded into the process space; and
responsive to reception of the change event and based on the maintained branch table, (a) automatically unloading from the process space the at least one library, and (b) automatically reloading into the process space the at least one library, such that the at least one library is dynamically modifiable.

* * * * *